United States Patent [19]
Kenmochi et al.

[11] Patent Number: 5,923,377
[45] Date of Patent: Jul. 13, 1999

[54] JITTER REDUCING CIRCUIT

[75] Inventors: Takashi Kenmochi, Kanagawa-ken; Hiroshi Takeshita, Hiratsuka; Tsuneo Ubukata, Kanagawa-ken, all of Japan

[73] Assignee: Victor Company of Japan, Ltd., Yokohama, Japan

[21] Appl. No.: 08/755,695

[22] Filed: Nov. 25, 1996

[30] Foreign Application Priority Data

Dec. 22, 1995 [JP] Japan ................................ 7-350249

[51] Int. Cl.$^6$ .............................. H04N 7/00; H04N 5/04; H03L 7/00
[52] U.S. Cl. .................... 348/497; 348/501; 348/537; 386/13; 386/85
[58] Field of Search .................................. 348/497, 512, 348/735, 536, 540, 604, 683, 513, 537, 500, 501, 541; 386/85, 20, 21, 86, 92, 13; 360/26; H04N 5/95

[56] References Cited

U.S. PATENT DOCUMENTS

| | | | |
|---|---|---|---|
| 3,900,885 | 8/1975 | Tallent et al. ................................ | 358/8 |
| 4,081,834 | 3/1978 | Takamiya et al. ........................ | 358/158 |
| 5,504,534 | 4/1996 | Sakaegi .................................... | 348/513 |

FOREIGN PATENT DOCUMENTS 7-107440  4/1995  Japan .

Primary Examiner—Nathan Flynn
Assistant Examiner—John W. Miller
Attorney, Agent, or Firm—Michael N. Meller

[57] ABSTRACT

A sync signal correction circuit generates a corrected sync signal which is obtained by correcting a timing of a sync signal on the basis of a time axis variation component (jitter component) of the sync signal separated from a picture signal. The corrected sync signal is used as the sync signal to cause a variation of time axis error of the picture signal to follow a variation of time axis error of an output signal of an automatic frequency control (AFC) circuit which constitutes a monitor device for reproducing and displaying the picture signal, such that the variation of time axis error of the output signal of the AFC circuit and the variation of time axis error of the picture signal of the reproduced picture signal are cancelled each other to prevent jittere from appearing on a display screen.

5 Claims, 7 Drawing Sheets

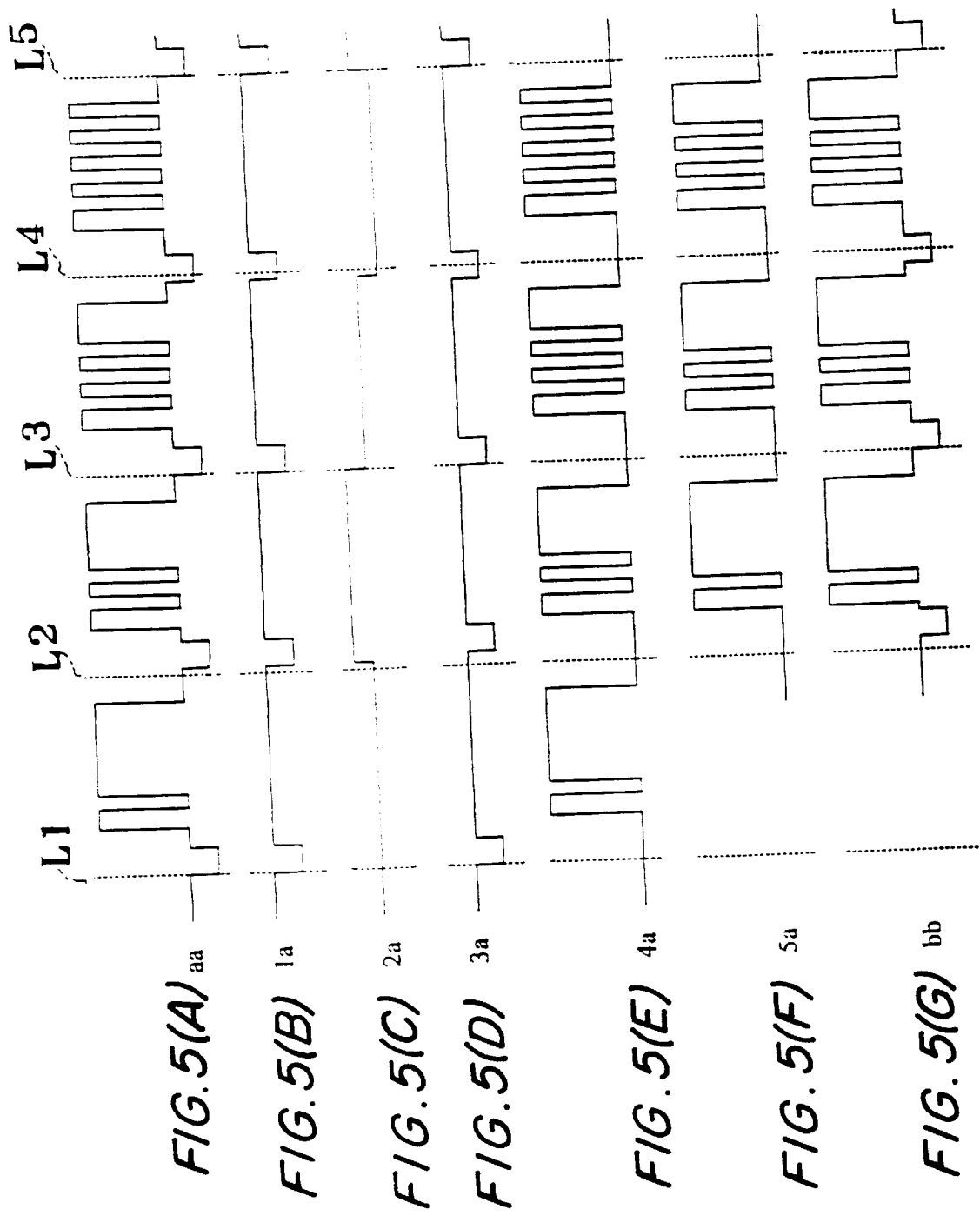

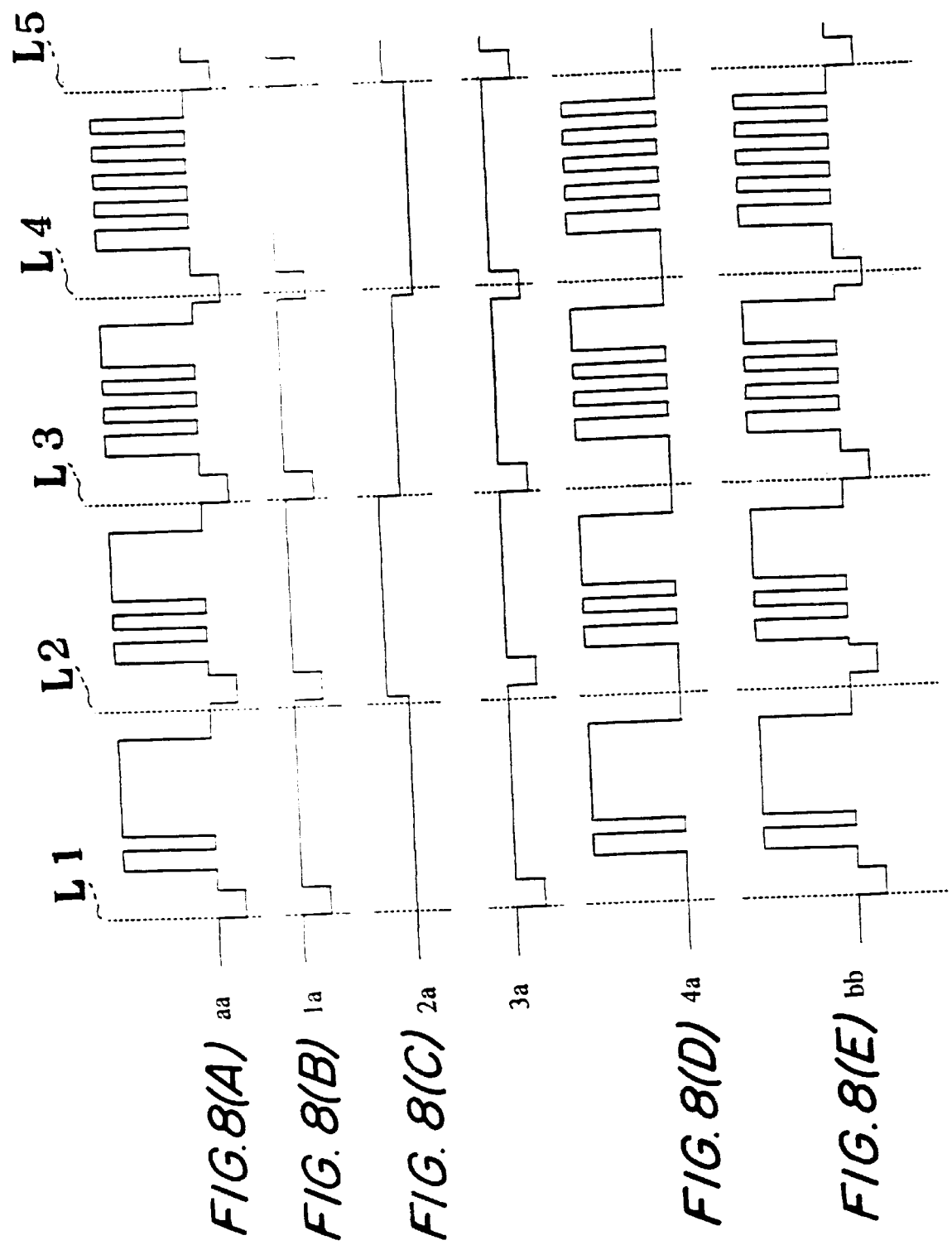

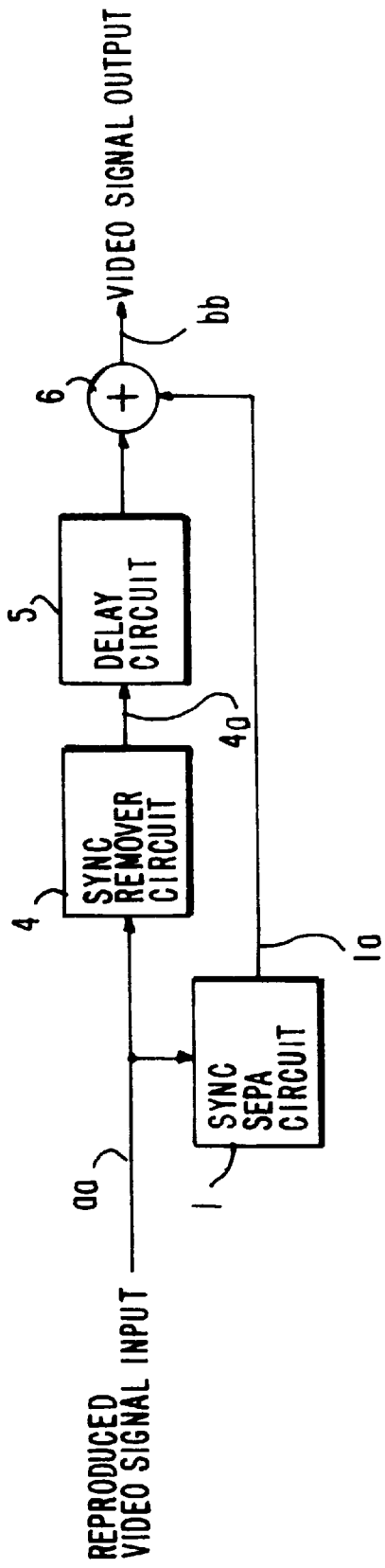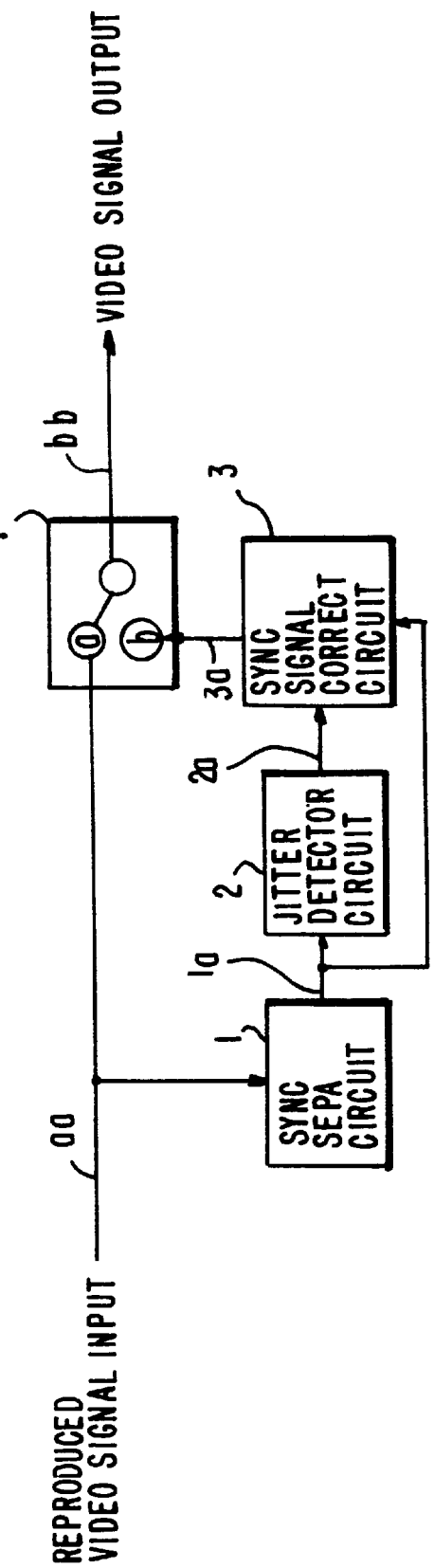

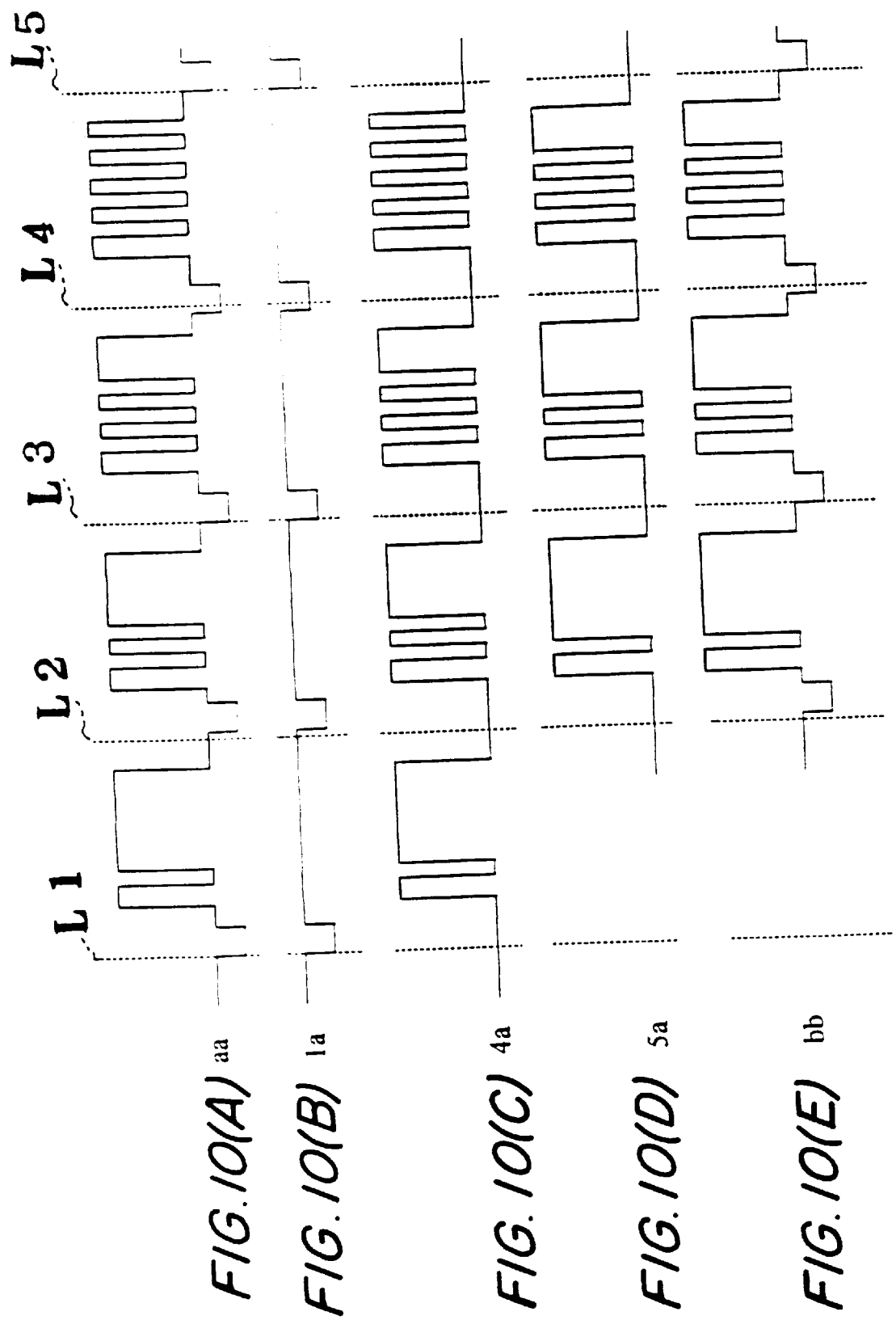

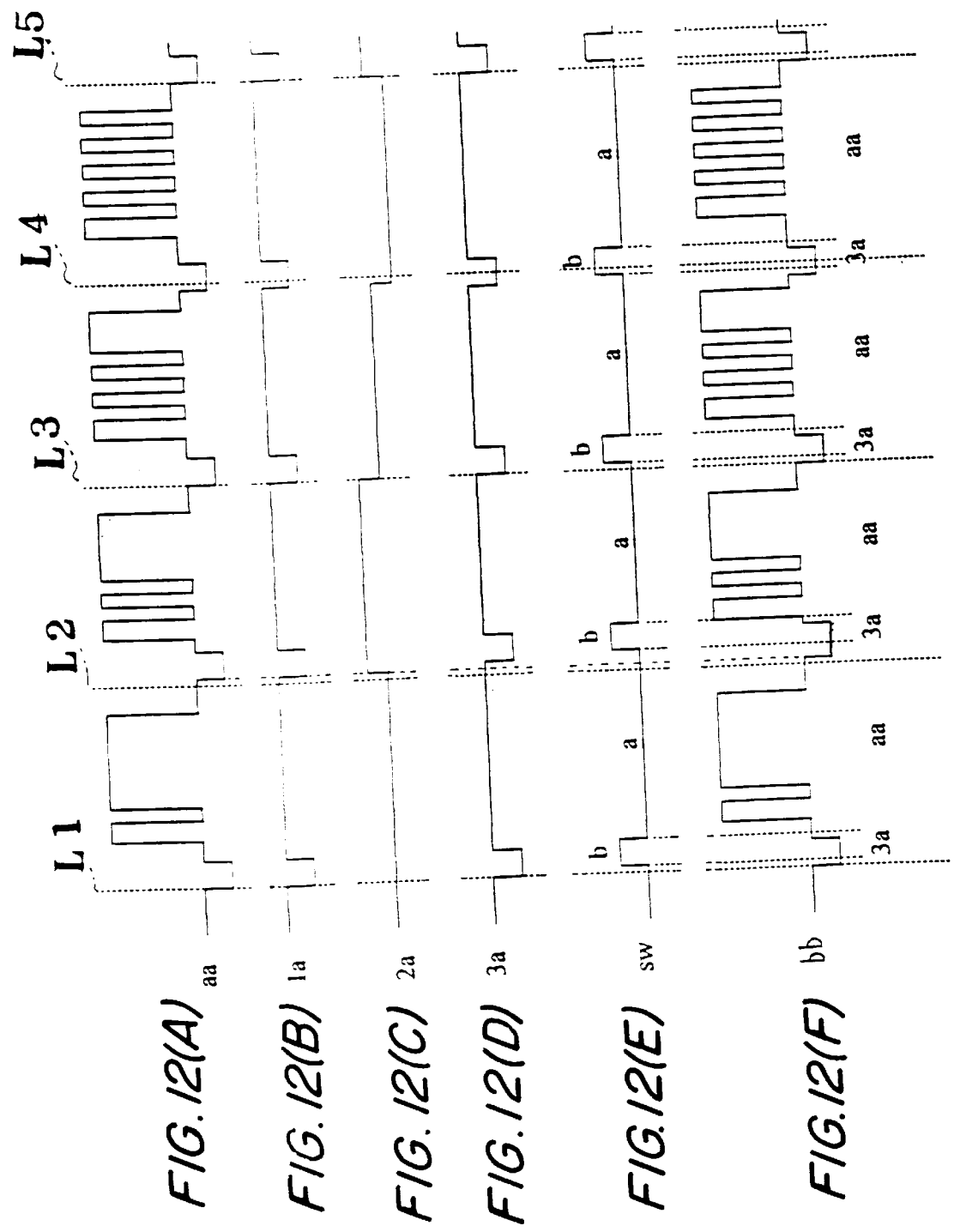

JITTER REDUCING CIRCUIT

BACKGROUND OF THE INVENTION

1. Field of the Invention

The present invention relates to a jitter reducing circuit for reducing fluctuation sitter) of a picture displayed on an image screen of a monitor device.

2. Description of the Prior Art

When a video signal recorded on a magnetic tape is reproduced by a known helical scan type VTR, there may appear a variation of phase of a reproduced picture signal due to variation of magnetic tape running speed and/or variation of rotation speed of a rotary head, etc. The variation of phase on a time axis is called time axis error or jitter. When a picture signal containing jitter is displayed on an image screen of a monitor device, etc., as an image, the image on the screen fluctuates.

Such jitter may also occur due to other reasons such as variation of rotation speed of a disk, eccentricity thereof and vibration thereof when a picture signal is reproduced from a video disk by a video disk reproducing device.

On the other hand, in the afore-mentioned monitor device, a video image reproduced on the monitor screen may be influenced adversely by noise mixed in a sync signal. In order to prevent such adverse influence, an automatic frequency control (AFC) circuit constituting a horizontal deflection circuit of the monitor device is usually used to synchronize an operation of the monitor device with an average period of a plurality of sync signals.

Such prior art and problems inherent thereto will be described with reference to FIGS. 1 to 3, in which FIG. 1 is a block diagram of a portion of a horizontal deflection circuit of a monitor device, FIG. 2 shows a relation between a reproduced signal and an output of the AFC circuit and FIG. 3 is a block diagram of a TBC (Time Base Correction) circuit.

As shown in FIG. 1, the portion of the horizontal deflection circuit of the monitor device is constituted with a sync separation circuit 61 for separating a sync signal of an input picture signal (monitor input) bb, the AFC circuit 62 for correcting phase of the sync signal from the sync separation circuit 61 and a subtractor 63 for producing a difference between the picture signal bb and the output of the AFC circuit 62.

The AFC circuit 62 is constituted with a phase detector circuit, an integrator circuit, a variable control oscillator (VCO) and a comparing signal generator circuit, etc., all of which are not shown. The phase detector circuit compares a phase of a comparing signal (saw tooth voltage) with a phase of an incoming horizontal sync signal and outputs a correction voltage corresponding to a phase difference if any. The correction voltage which takes in the form of pulse voltage is averaged by the integration circuit and controls the horizontal oscillator circuit. The horizontal oscillator circuit (voltage control oscillator) generates a stable horizontal pulse signal on the basis of the correction voltage.

In the horizontal oscillator circuit, when jitter of an input picture signal (for example, a video signal reproduced by a VTR, that is, a sync signal contained in the video signal) and jitter of the output signal of the AFC circuit 62 have a certain phase difference and a certain amplitude difference, jitter contained in an output of the subtractor 63 can not be removed, as shown in FIG. 2. Incidentally, FIG. 2 shows waveforms of jitter components of the sync signal, the video signal and the output signal of the AFC circuit 62, for showing a relation between jitters contained therein.

When the video signal containing jitter is supplied to the monitor device, the above mentioned fluctuation of image occurs since jitter of the output signal of the AFC circuit 62 does not completely follow jitter of the reproduced picture signal. In detail, since jitter of the output signal of the AFC circuit 62 does not follow jitter contained in the sync signal of the reproduced picture signal, the reproduced image on the monitor screen fluctuates.

In order to solve this problem, the conventional VTR is provided with a TBC (Time Base Correcter) circuit to remove the time axis variation of the reproduced signal, which occurs in a recording/reproducing process.

As shown in FIG. 3, the TBC circuit is constituted with a sync separator circuit 72 for separating a horizontal sync signal from a luminance signal reproduced by a VTR 71, a PLL circuit 73 for producing a write clock for a memory 76 on the basis of the horizontal sync signal from the sync separator circuit 72, an A/D converter 75 for converting the luminance signal reproduced by the VTR 71 into a digital signal, the memory 76 for reading/writing the digital signal converted by the A/D converter 75, a D/A converter 77 for converting the digital signal read out from the memory 76 into the analog luminance signal and an oscillator 74 for producing a read clock for reading the signal written in the memory 76. The TBC circuit further includes a decoder 78 and an encoder 79 as to be described later.

Since the PLL circuit 73 produces the write clock having frequency which is a multiple of that of the sync signal and, thus, the write clock follows jitter of the reproduced signal, the reproduced luminance signal is written in the memory 76 by the write clock. The luminance signal written in the memory 76 is read out by the stable read clock produced by the oscillator 74, resulting in that jitter of the luminance signal is removed and the luminance signal containing no jitter is obtained.

The VTR 71 simultaneously reproduces a chrominance or color signal which is converted by the decoder 78 into color difference signals and then jitter thereof is removed in a similar manner to the jitter removal of the luminance signal. The jitter removed color difference signals are encoded by the encoder 79 to the standard signal to be interleaved with the luminance signal.

Since, however, the TBC circuit is adapted to convert the luminance signal and the color signal into digital signals and write them in and read them from the memory, its construction becomes complex and expensive and a control thereof is complicated.

Under the circumstance, a realization of a jitter reducing circuit which is simple in construction and capable of preventing an image on a monitor screen from being fluctuated has been requested.

SUMMARY OF THE INVENTION

An object of the present invention is to provide a jitter reducing circuit which is simple in construction and capable of preventing an image on a monitor screen from being fluctuated.

Another object of the present invention is to provide a jitter reducing circuit which is capable of reducing the fluctuation (jitter) of an image on a display screen of a monitor device by causing jitter of a reproduced picture signal to follow jitter of an output signal of an AFC circuit.

A further object of the present invention is to provide a jitter reducing circuit capable of reducing jitter effectively even when a dubbing is performed by a VTR.

In order to achieve these objects, a jitter reducing circuit according to the present invention comprises a correction sync signal generator for producing a corrected sync signal which is a sync signal separated from a picture signal and has a timing corrected on the basis of a time axis variation component of the sync signal and a follower circuit for causing variation of a time axis error of the picture signal to follow variation of a time axis error of an output of an automatic frequency control circuit constituting a monitor device for reproducing and displaying the picture signal by using the correction sync signal as the sync signal of the picture signal such that variation (jitter) of the time axis error of the output of the automatic frequency control circuit and variation (jitter) of the time axis error of the picture signal are cancelled out each other.

In another aspect of the present invention, a jitter reducing circuit of the present invention comprises a sync signal separator circuit for separating sync signal from a picture signal, a sync signal removing circuit for removing the sync signal from the picture signal, a delay circuit for delaying the picture signal obtained by the sync signal removing circuit and having no sync signal by a predetermined time and a combiner circuit for combining the picture signal output from the delay circuit and the sync signal output from the sync signal separator circuit.

In a further aspect of the present invention, a jitter reducing circuit comprises a corrected sync signal generator for producing a corrected sync signal which is a sync signal separated from a video signal and has a timing corrected on the basis of a time axis variation component of the sync signal and a follower circuit having one input terminal supplied with the video signal and the other input terminal supplied with the correction sync signal, for causing variation of a time axis error of the picture signal to follow variation of a time axis error of an output signal of an automatic frequency control circuit constituting a monitor device for reproducing and displaying the picture signal by replacing at least a portion of the sync signal by the corrected sync signal by selectively switching between the one and the other input terminals such that variation (jitter) of the time axis error of the output signal of the automatic frequency control circuit and variation (jitter) of the time axis error of the picture signal are cancelled out each other.

BRIEF DESCRIPTION OF THE DRAWINGS

FIG. 5 is a timing chart of an operation of the first embodiment of the jitter reducing circuit shown in FIG. 4;

FIG. 8 is a timing chart of an operation of the second embodiment;

FIG. 9 is a block diagram of a third embodiment of a jitter reducing circuit according to the present invention;

FIG. 10 is a timing chart of an operation of the third embodiment;

FIG. 11 is a block diagram of a fourth embodiment of a jitter reducing circuit according to the present invention; and FIG. 12 is a timing chart of an operation of the fourth embodiment.

DETAILED DESCRIPTION

First Embodiment

Figure 4:
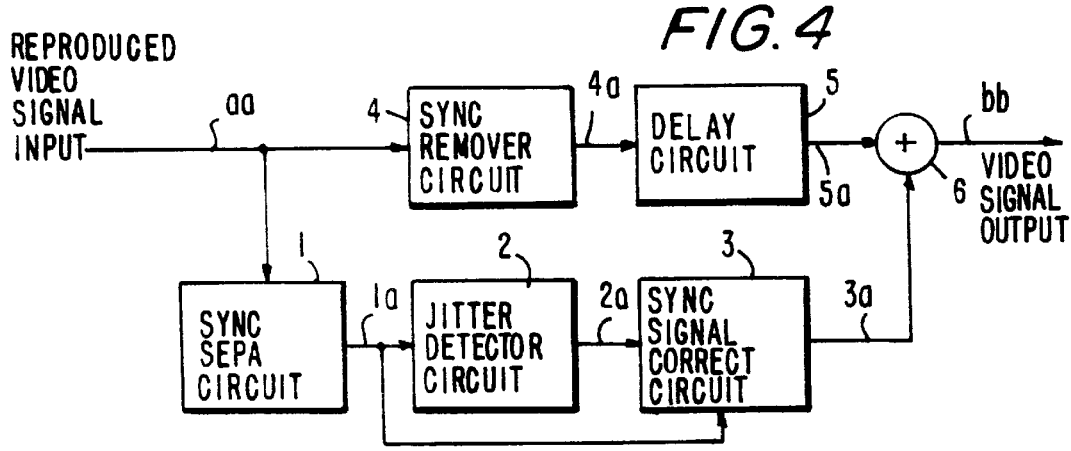
FIG. 4 is a block diagram of a first embodiment of a jitter reducing circuit according to the present invention.

A first embodiment of a jitter reducing circuit according to the present invention comprises a sync separator circuit (referred to as merely "separator circuit", hereinafter) 1, a jitter detector circuit (referred to as merely "detector circuit", hereinafter) 2, a sync signal correction circuit (referred to as merely "correction circuit", hereinafter) 3, a sync signal remover circuit (referred to as merely "remover circuit", hereinafter) 4, a delay circuit 5 and a combiner circuit (adder), as shown in FIG. 4.

A reproduced video signal aa which has waveform A such as shown in FIG. 5 and contains jitter is input to the separator circuit 1. The separator circuit 1 separates a horizontal sync signal 1a having waveform B such as shown in FIG. 5 from the video signal aa. Incidentally, vertical dotted lines L1 to L5 in FIG. 5 show an ideal timing of the sync signal.

The detector circuit 2 detects a jitter component of the horizontal sync signal 1a separated from the video signal by the separator circuit 1. That is, the detector circuit 2 supplies a signal obtained by measuring time interval of the sync signal 1a supplied from the separator circuit 1 to the correction circuit 3 as a detection signal 2a. A waveform C in FIG. 5 shows an example of the detection signal 2a. The detection signal corresponds to a time differential of the measured signal.

The correction circuit 3 corrects phase of the sync signal 1a on the basis of the detection signal 2a obtained from the detector circuit 2. In more detail, the correction circuit 3 suitably filters and amplifies the detection signal 2a from the detector circuit 2 to obtain a correction signal. The correction circuit 3 is further supplied with the sync signal 1a from the separator circuit 1 and corrects phase of the sync signal 1a on the basis of the correction signal. That is, the correction circuit 3 makes the amount of correction for the sync signal 1a variable by making an amplitude of the correction signal variable. A corrected sync signal 3a having waveform D in FIG. 5 thus obtained is supplied to the combiner circuit (adder) 6.

On the other hand, the video signal aa is also supplied to the remover circuit 4. The remover circuit 4 removes the sync signal component thereof by cutting a sync signal level (from a pedestal level to a sink chip level of a video signal). The video signal whose horizontal sync signal component is removed by the remover circuit 4 is supplied to the delay circuit 5 as a picture signal 4a having waveform E shown in FIG. 5.

The delay circuit 5 supplies a delayed picture signal 5a obtained by delaying the picture signal 4a by a predetermined time to the combiner circuit 6. The predetermined delay time is between the time delay for the jitter correction and a response time of the AFC circuit. The delayed picture signal 5a output from the delay circuit 5 has a waveform F shown in FIG. 5. In this example, the picture signal 4a is delayed by a time corresponding to one field. The combiner circuit 6 combines the corrected sync signal 3a and the delayed picture signal 5a, resulting in a video signal bb which has a waveform G shown in FIG. 5 and which is the video signal aa whose phase of the sync signal is corrected.

Figure 1:
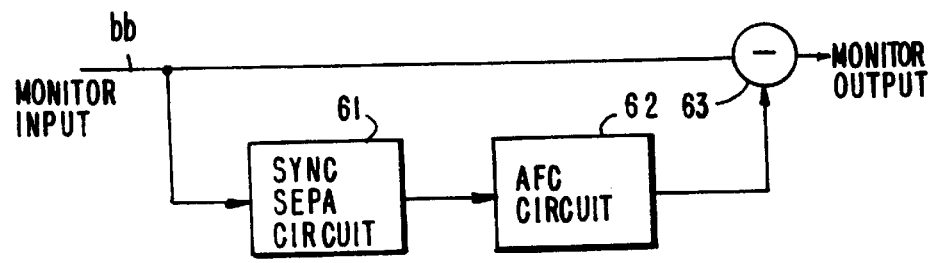
FIG. 1 is a block diagram showing a portion of a horizontal deflection circuit of a monitor device.
Figure 2:
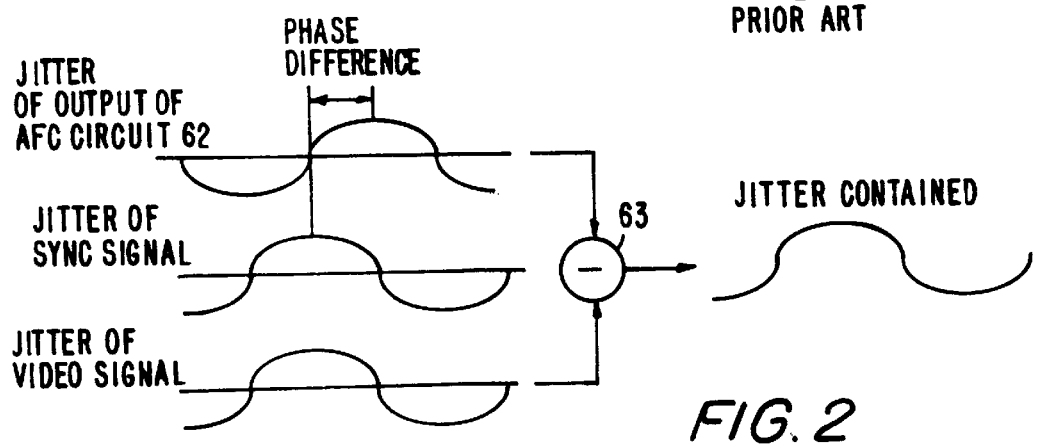
FIG. 2 shows waveforms for explaining jitter produced by a specific relation between a reproduced signal and an output of an AFC circuit.
Figure 3:
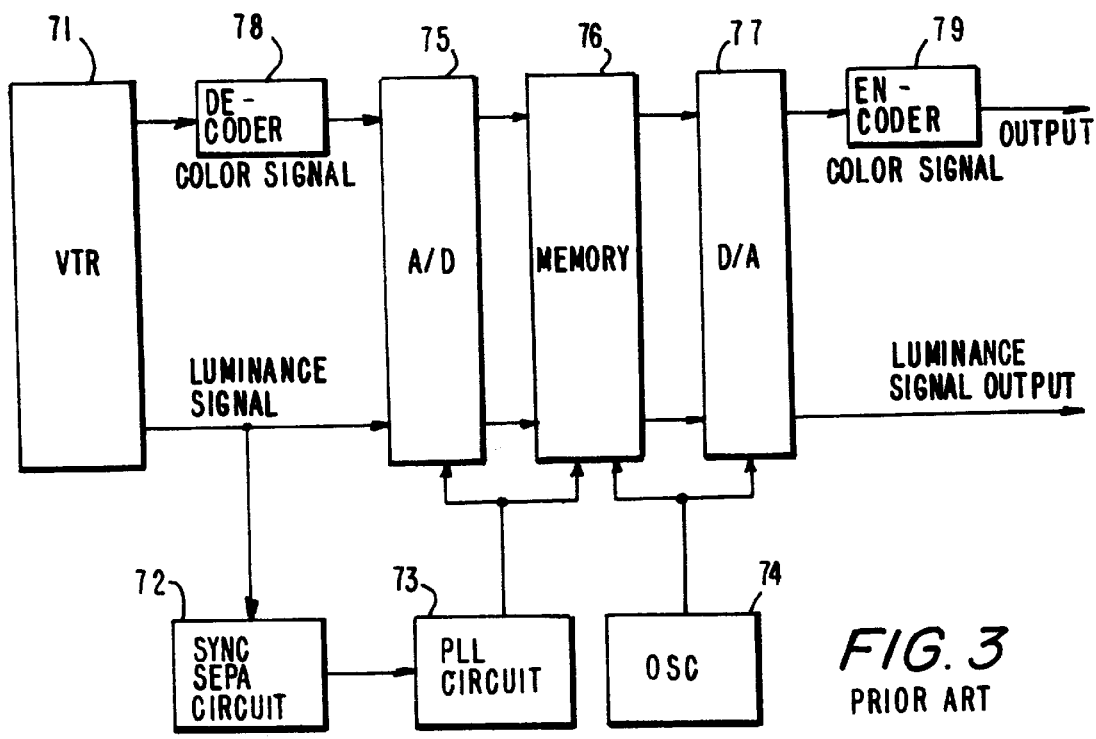
FIG. 3 is a block diagram of a TBC circuit.
Figure 6:
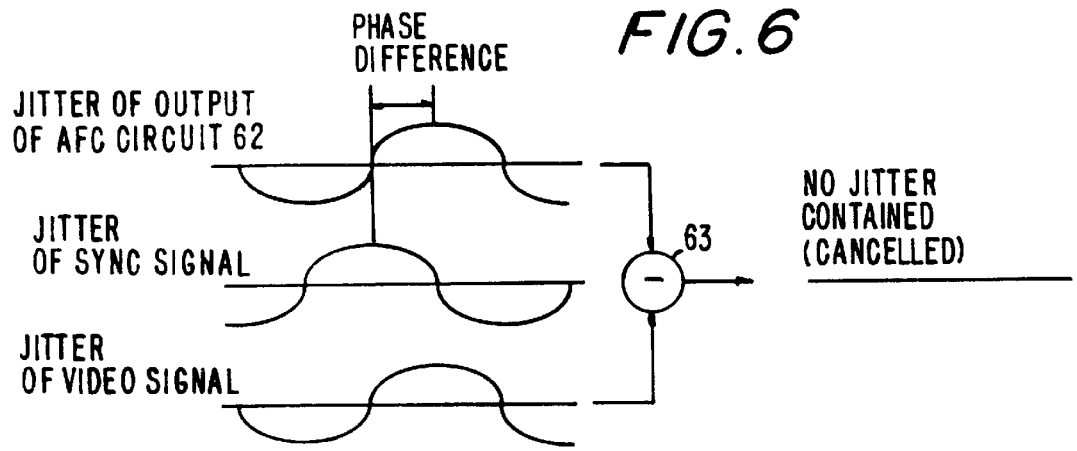
FIG. 6 is a diagram for explaining a principle of jitter reduction by the jitter reducing circuit according to the present invention.

The video signal bb is supplied to a monitor device (not shown) through a transmission channel (not shown). In general, jitter of the output signal of the AFC circuit 62 follows jitter of the sync signal of the video signal with a delay of a certain time with respect to the sync signal jitter (cf. FIG. 2). Thus, the picture signal is delayed by a time corresponding to the certain time to correct the phase of the sync signal such that, as an output of the subtractor circuit 63, the jitter of the picture signal and the jitter of the output signal of the AFC circuit 62 are cancelled out each other. Thus, the jitter of the output signal of the AFC circuit 62 (that is, the response of the AFC circuit 62) follows the jitter of the picture signal as shown in FIG. 6 and there is no jitter appeared on the output of the subtractor 63. As a result, it is possible to effectively prevent fluctuation on the monitor screen from occurring.

Second Embodiment

Figure 7:
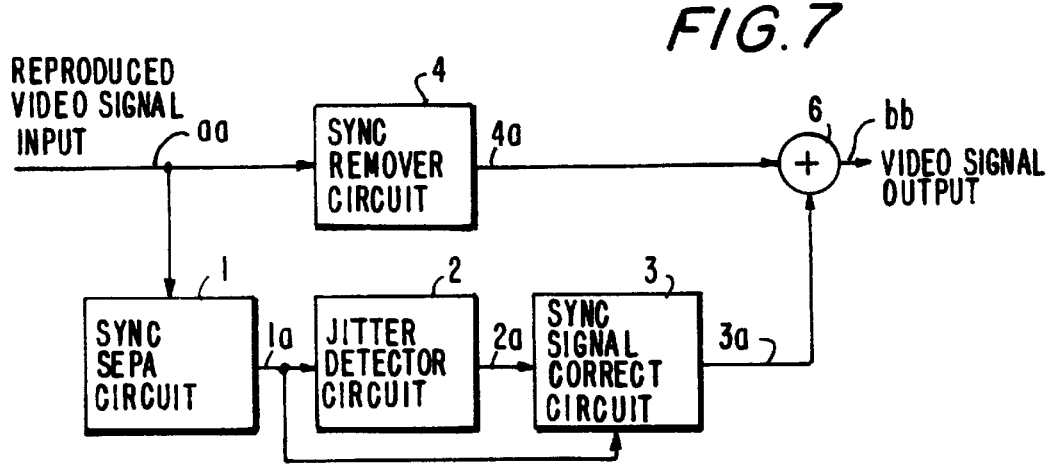
FIG. 7 is a block diagram of a second embodiment of a jitter reducing circuit according to the present invention.

A second embodiment of the jitter reducing circuit according to the present invention will be described. As shown in FIG. 7, the second embodiment differs from the first embodiment in that the delay circuit 5 of the first embodiment shown in FIG. 4 is removed. In the jitter reducing circuit of the second embodiment, jitter of the output of the AFC circuit 62 and jitter of the picture signal are cancelled out each other by correcting phase of the sync signal 1a by means of the correction circuit 3.

Signal waveforms A to F at respective portions of the second embodiment shown in FIG. 7 are shown in FIG. 8. In FIG. 8, vertical dotted lines L1 to L5 show an ideal timing of the sync signal.

In general, jitter of a video signal has a wide frequency band and the higher the signal frequency results in the larger the phase shift of an output signal of the AFC circuit having a response delay, causing the effect of jitter improvement to be degraded. In order to improve jitter even at high frequency by using the jitter reducing circuit of the present invention, the delay circuit 5 is necessary. However, since jitter which provides visual problem has only low frequency and large amplitude jitter, it becomes possible to remove the delay circuit 5 by reducing jitter in a low frequency range.

That is, it is possible to cause jitter of the output signal of the AFC circuit 62 to follow jitter of the picture signal by correcting the timing of the sync signal 1a obtained from the sync separator circuit 1 according to an amplitude of a low frequency component of jitter of the sync signal 1a, that is, by making the phase of the sync signal 1a variable, so that jitter of the output of the AFC circuit 62 and jitter of the video signal are cancelled out each other.

That is, the picture signal 4a obtained through the remover circuit 4 is combined with the sync signal 3a corrected by the correction circuit 3 by the combiner circuit 6 to produce the video signal bb with which jitter (response) of the output signal of the AFC circuit 62 follows jitter of the video signal.

As described, according to the second embodiment, the jitter reducing circuit having a simpler construction than that of the jitter reducing circuit of the first embodiment due to the fact that the delay circuit 5 is removed can be realized.

Third Embodiment

A third embodiment of the jitter reducing circuit according to the present invention will be described. As shown in FIG. 9, the third embodiment differs from the first embodiment in that the detector circuit 2 and the correction circuit 3 of the first embodiment shown in FIG. 4 are removed. In the jitter reducing circuit of the third embodiment, the fact that the output signal of the AFC circuit 62 of the monitor device follows the sync signal of the video signal with a time delay is utilized. That is, jitter of the output signal of the AFC circuit 62 follows jitter of the video signal by delaying only the picture signal by a time correspondingly to the time delay.

Signal waveforms A to E at respective portions of the third embodiment shown in FIG. 9 are shown in FIG. 10. In FIG. 10, vertical dotted lines L1 to L5 also show an ideal timing of the sync signal.

Since jitter of a picture signal is obtained after a certain time from jitter of the sync signal as mentioned above, jitter of the output signal of the AFC circuit 62 can follow jitter of the picture signal by delaying the picture signal by a predetermined amount of time by the delay circuit 5.

As described, according to the third embodiment, the jitter reducing circuit having a simpler construction than that of the jitter reducing circuit of the first embodiment due to the fact that the detection circuit 2 and the correction circuit 3 of the first embodiment are removed can be realized.

Fourth Embodiment

A fourth embodiment of a jitter reducing circuit according to the present invention differs from the jitter reducing circuit according to the first embodiment shown in FIG. 4 in that the remover circuit 4 and the delay circuit 5 of the first embodiment are removed and that a switch circuit 7 is provided instead of the combiner 6 of the first embodiment, as shown in FIG. 11.

Signal waveforms A to F at respective portions of the fourth embodiment shown in FIG. 11 are shown in FIG. 12. In FIG. 12, vertical dotted lines L1 to L5 show an ideal timing of the sync signal.

The switch circuit 7 outputs the video signal aa and the corrected sync signal 3a from the correction circuit 3 selectively with a predetermined timing to replace the sync signal contained in the reproduced video signal by the corrected sync signal 3a from the correction circuit 3.

That is, the corrected sync signal 3a is obtained by correcting the timing of the sync signal 1a separated from the video signal aa correspondingly to an amplitude of the jitter component of the sync signal 1a and, by outputting the corrected sync signal 3a as the sync signal of the video signal, the jitter (response) of the output signal of the AFC circuit 62 can follow the jitter of the video signal.

As described, according to the fourth embodiment, the jitter reducing circuit having a simpler construction than that of the jitter reducing circuit of the first embodiment can be realized.

The jitter reducing circuit according to the present invention is effectively used in the video signal reproducing apparatus such as helical scan type VTR or video disk reproducing device, etc. For example, a case where a video signal whose sync signal is substituted by the corrected sync signal corrected by the jitter reducing circuit of the present invention is recorded and a reproduced video signal is passed again through the jitter reducing circuit will be considered.

For example, a video signal reproduced from a first tape cassette by a first VTR having the jitter reducing circuit is recorded on a second tape cassette by a second VTR. Since the sync signal of the video signal recorded on the second tape cassette is substituted by the corrected sync signal by the jitter reducing circuit, the video signal of the second tape cassette is reproduced by the first VTR having the jitter reducing circuit and supplied again to the jitter reducing circuit to improve jitter.

However, since phase of the picture signal of the reproduced video signal and phase of the sync signal thereof were already shifted from each other and there is no correlation between the reproduced sync signal and jitter produced by the first VTR, it is impossible to accurately detect jitter by using the sync signal and reduction of jitter becomes impossible.

This problem can be solved by correcting not a falling edge of the sync signal but a rising edge thereof and performing the jitter detection by detecting the rising edge of the sync signal.

Now, a case where, in the fourth embodiment, only the rising edge of the sync signal is corrected by detecting jitter with using the failing edge of the sync signal will be described. In the fourth embodiment; this is performed by modifying the switching operation of the switch circuit 7.

The falling edge of the sync signal corresponds to a front half portion (front edge portion) of the sync signal in which the signal level falls from the pedestal level to the sink chip level and the rising edge corresponds to a rear half portion (rear edge portion) of the sync signal in which the signal level rises from the sink chip level to the pedestal level.

When the video signal containing the sync signal thus corrected is recorded by the VTR, the falling edge of the sync signal and the picture signal of the video signal are in phase. Therefore, it is possible to detect jitter with the falling edge of the sync signal when the video signal is reproduced and, by correcting the rising edge of the sync signal correspondingly to the detected jitter, it is possible to reduce the jitter.

That is, the detection circuit 2 detects jitter by using the falling edge (front edge) of the sync signal and the switch circuit 7 corrects a position of the rising edge (rear edge) of the sync signal. By operating the jitter detection portion and the sync signal correction portion independently in the described manner, it is possible to reduce jitter even when the signal which is recorded through the jitter reducing circuit fiber a purpose of, for example, dubbing, is passed through the jitter reducing circuit again.

In concrete, the switch circuit 7 outputs the reproduced video signal through a terminal a until the falling edge of the sync signal of the picture signal is detected and, thereafter, corrects only timing of the rising edge of the sync signal by outputting the corrected sync signal through a terminal b.

That is, in the fourth embodiment, the switch circuit 7 is connected to the terminal b during a period in which the switch control signal E in FIG. 12 is in high level and connected to the terminal a during a period in which the control level is in low level, so that the switch circuit 7 corrects only timing of the rising edge of the sync signal.

Incidentally, the falling edge of the sync signal of the picture signal is detected by using, for example, the timing of the sync signal detection in the separator circuit 1. Further, the corrected sync signal 3a may be used as the switch control signal or the latter signal may be produced by a control signal generator circuit which is not shown.

Since the jitter reducing circuit of the present invention processes signals uniformly regardless of characteristics of the AFC circuit of the individual monitor device, there may a case where the effect of the image fluctuation on the display screen of the monitor device becomes different according to high or low response speed of the AFC circuit, that is, advance or delay of jitter phase. However, since, in such case, it is enough to change the amount of correction of the sync signal it is possible to visually improve the fluctuation of image on the display screen of the monitor device regardless of the characteristics of the AFC circuit used in the monitor device.

Although the jitter reducing circuit according to the present invention has been described as applied to the VTR, it is also applicable to other devices such as video disk reproducing device, etc., for reproducing a picture signal containing jitter, as mentioned previously.

In each of the described embodiments shown in FIGS. 4, 7, 9 and 11, the sync signal separator circuit 1 is dedicated to the jitter reducing circuit of the present invention. However, it is, of course, possible to detect jitter or to produce a corrected sync signal by using a sync signal from a sync signal separator circuit designed for other purpose than that of the present invention.

As described in detail hereinbefore, according to the present invention, it is possible to relate jitter of an output signal of an AFC circuit of a monitor device to jitter of a reproduced video signal such that jitter of the output signal of an AFC circuit of a monitor device and jitter of a reproduced sync signal contained in a reproduced picture signal are cancelled out each other by separating the reproduced sync signal from the reproduced picture signal correcting its time axis variation component and combining it with the reproduced picture signal again. Therefore, it is possible to reduce fluctuation of a picture on a display device of the monitor device with using a simple circuit constriction.

What is claimed is:

1. A jitter reducing circuit for correcting a time axis variation component of a video picture signal, comprising:

correction sync signal generator for producing a correction sync signal which is a sync signal separated from a picture signal and has a timing corrected on the basis of a time axis variation component of the sync signal; and follower means for causing variation of time axis error of the picture signal to follow variation of a time axis error of an output signal of an automatic frequency control circuit constituting a monitor device for reproducing and displaying the picture signal by using the corrected sync signal as the sync signal of the picture signal such that variation of the time axis error of the output signal of the automatic frequency control circuit and variation of the time axis error of the picture signal to cancel each other out, wherein said follower means comprises:

removing means for removing the sync signal from the picture signal; and combining means for combining the picture signal from said removing means and the corrected sync signal with said jitter reducing circuit further comprising delay means for delaying the picture signal from said removing means by a predetermined time and supplying the delayed picture signal to said combining means.

2. A video picture signal processing apparatus for processing a video picture signal containing a synchronization "sync" signal to minimize jitter fluctuations in the video picture signal when displayed upon a monitor comprising:

sync separation means for separating the sync signal from the video picture signal;

removing means for removing the sync signal from the video picture signal to form an analog video picture signal without a sync component;

sync signal correcting means for producing a time corrected sync signal on the basis of a time axis variation component of the separated sync signal; and means for adding the time corrected sync signal to the analog video picture signal to form a reproduced video picture output signal wherein said reproduced video picture output signal when directly connected to a TV monitor device containing sync separation means, an automatic frequency control circuit and combining means for combining the output from the automatic frequency control circuit with the reproduced video picture output signal subtracts jitter fluctuations in the reproduced video picture output signal from corresponding jitter fluctuations present in the output of the automatic frequency control circuit cancelling each other out comprising switch means having one input terminal supplied with the video picture signal and the other input terminal supplied with the time corrected sync signal, for selectively switching said one and the other input terminals to replace at least a portion of the sync signal by the time corrected sync signal.

3. A jitter reducing circuit for correcting a time axis variation component of a picture signal, comprising:

correction sync signal generator for producing a correction sync signal which is a sync signal separated from a picture signal and has a timing corrected on the basis of a time axis variation component of the sync signal; and follower means for causing variation of time axis error of the picture signal to follow variation of a time axis error of an output signal of an automatic frequency control circuit constituting a monitor device for reproducing and displaying the picture signal such that variation of the time axis error of the output signal of the automatic frequency control circuit and variation of the time axis error of the picture signal cancel each other out, switch means having one input terminal supplied with the video picture signal and the other input terminal supplied with the time corrected sync signal, for selectively switching said one and the other input terminals to replace at least a portion of the sync signal by the time corrected sync signal wherein said switch means comprises means for controlling the switching between said one and the other input terminals such that only a rear edge timing of the sync signal is corrected.

4. A jitter reducing circuit as claimed in claim 3 further comprising detection means for detecting the time axis variation of the sync signal by the front edge of the sync signal and outputting a detection signal, and wherein said corrected sync signal generator means generates the corrected sync signal according to the detection signal.

5. A jitter reducing circuit for correcting a time axis variation component of a picture signal, comprising:

correction sync signal generator for producing a correction sync signal which is a sync signal separated from a picture signal and has a timing corrected on the basis of a time axis variation component of the sync signal; and follower means for causing variation of time axis error of the picture signal to follow variation of a time axis error of an output signal of an automatic frequency control circuit constituting a monitor device for reproducing and displaying the picture signal such that variation of the time axis error of the output signal of the automatic frequency control circuit and variation of the time axis error of the picture signal cancel each other out, switch means having one input terminal supplied with the video picture signal and the other input terminal supplied with the time corrected sync signal, for selectively switching said one and the other input terminals to replace at least a portion of the sync signal by the time corrected sync signal further comprising detection means for detecting a time axis variation component on the basis of the front edge of the sync signal and outputting a detection signal, and wherein said corrected sync signal generation means produces the corrected sync signal according to the detection signal.

* * * * *